July 27, 1965 P. EDICK 3,197,148
METHOD AND APPARATUS FOR ATTACHING GUIDES TO FISHING RODS
Filed May 13, 1963 2 Sheets-Sheet 1

INVENTOR:
PHILIP EDICK

BY Frederick Breitenfeld
ATTORNEY

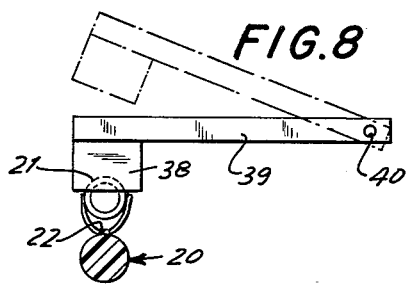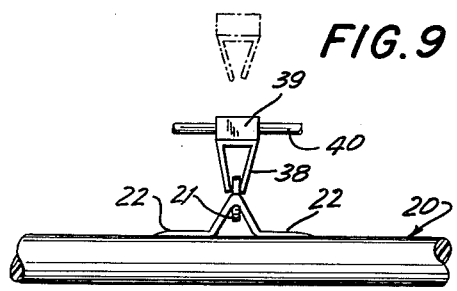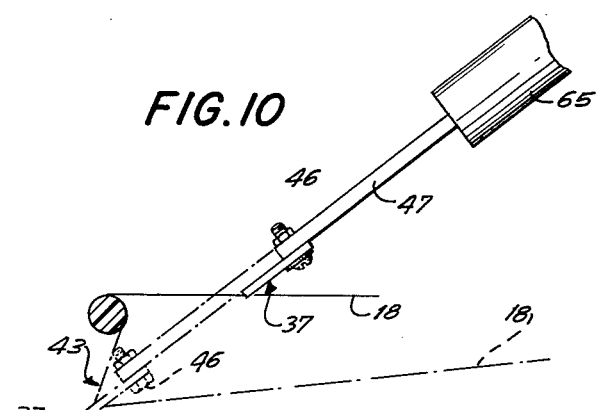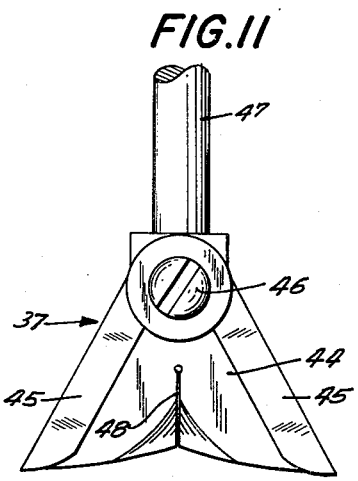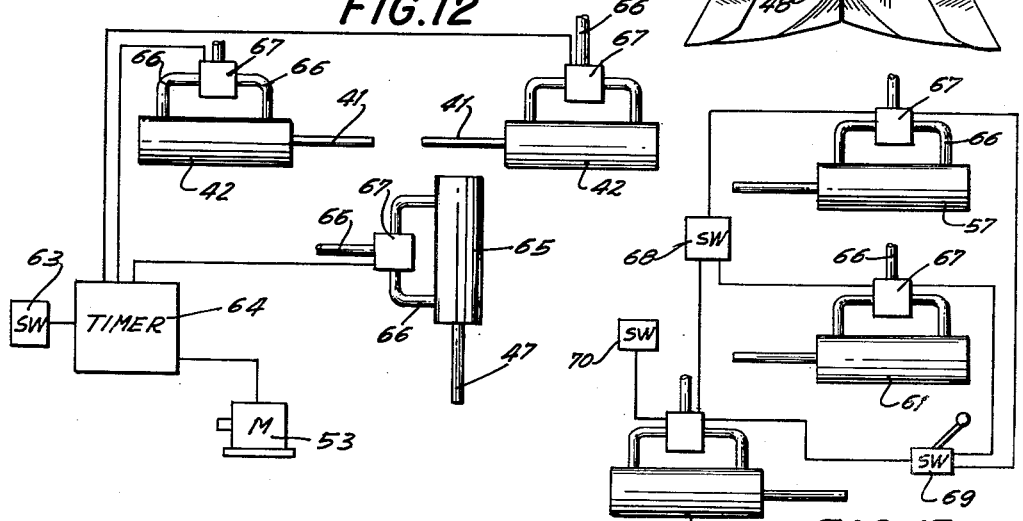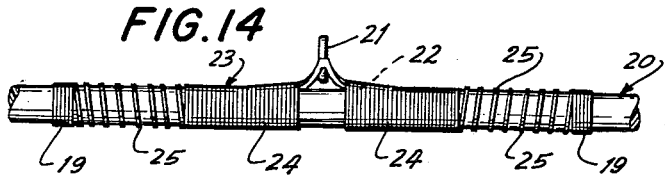

United States Patent Office 3,197,148
Patented July 27, 1965

3,197,148
METHOD AND APPARATUS FOR ATTACHING GUIDES TO FISHING RODS
Philip Edick, Beacon, N.Y., assignor to Sportsmen, Inc., Yonkers, N.Y., a corporation of New York
Filed May 13, 1963, Ser. No. 279,728
12 Claims. (Cl. 242—7)

This invention relates to the manufacture of fishing rods and the like, and has particular reference to improved apparatus for overlaying the rod with cord.

It is common practice to wind cord helically around a fishing rod at selected regions for purposes of ornamentation and also as a means for attaching guide loops through which the fishing line extends. The winding operations have heretofore been time-consuming and relatively expensive, and it is an object of this invention to provide apparatus by means of which the procedure can be considerably expedited and its cost materially reduced.

The applicability of the invention is not necessarily limited to fishing rods nor to the attachment of guide loops and similar elements, but because of the commercial importance of the problems involved in securing guide loops to fishing rods, and the usefulness of the improved apparatus in performing such an operation, the invention has been illustrated and will be described in relation to such guide loops and their attachment to fishing rods.

A guide loop of the type referred to is provided with a pair of oppositely extending attachment feet adapted to lie lengthwise on the rod. A firm securement can be achieved by whipping the rod and feet with cord which is wound in a tight helix around each attachment foot and the rod beneath it. Usually the winding continues beyond each foot, and for ornamentation purposes the pitch of the helix is slightly increased in these regions. The procedure is basically as follows: The rod is mounted for rotation on its axis. The cord is drawn toward the rod from a supply spool alongside of it; the winding is initiated by an operator; and when the rod is then rotated the operator guides the cord so that it winds itself around the rod in the desired helical fashion. The whipping is terminated by a cutting of the cord and an engagement of the end beneath the last few turns of the helix.

Among the disadvantages of the procedure as heretofore carried out in practice are these:

(a) Because of the inability of even a skilled operator to guide the cord with sufficient precision, a tight helix cannot be uniformly produced unless each winding is started on the rod itself at a slight distance from the guide loop and is caused to progress toward the guide loop, thence helically onto the corresponding attachment foot. Until the cord engages the foot it is necessary temporarily to hold the guide loop in proper position on the rod, and this involves extraneous retention means and added procedural steps.

(b) Manual guidance of the cord requires each helix to be individually produced. Therefore, where the guide loop has two attachment feet, two successive winding operations are required for each guide loop.

(c) Manual guidance of the cord during increase and decrease of helical pitch does not reliably produce uniformly good windings. Since an ornamental objective is involved, deviations are undesirable.

(d) Unless cord is used having a predetermined minimum tensile strength, ruptures are likely to occur because of the inability of the operator constantly to maintain just the right amount of tension on the cord during the winding operation.

(e) The severance of the cord just prior to the completion of each winding is a cumbersome operation, and calls upon the operator to perform the added step of temporarily snaring the new cord end while the operator's hands are engaged in finishing off the winding.

These disadvantages are obviated by apparatus embodying the novel features of the present invention. Numerous additional benefits can also be attained. For example, uniformly good quality windings of predetermined ornamental kind, having helical pitches of selected varying amounts, can be reliably produced in much larger commercial quantities. Multiple windings can be completed simultaneously. Cords can be successfully employed whose tensile strength is less than that heretofore found to be necessary to avoid ruptures. And far more windings can be produced in a given time by a single operator than has been possible in the past, resulting in substantial reductions in manufacturing cost.

It is a particular feature of the invention to mount a pair of cord spools in such a way, and at such a substantial distance from the rod, that a pair of cords approach the rod in close proximity and at substantially right angles to the rod. In this way, each winding can be initiated drectly at the gude loop so that the loop is immediately secured in proper position, and then, without any manual guidance of the cords, rotation of the rod can be caused to complete a pair of tight and uniformly perfect windings extending apart in opposite directions.

Another feature resides in the provision of special movable cord guides located between the rod and the supply spools, for automatically and controllably increasing and decreasing the pitch of each helix at selectively variable predetermined times.

Another feature lies in the provision of a special cord-engaging finger, and means for moving it automatically at predetermined times, to make it simpler for the operator to finish off each winding, and to hold the new cord end in readiness for the initiation of the next winding.

Other features relate to improved means for affording guided support for the rod during its rotations, for moving the rod axially through predetermined distances between winding operations, for varying the tension on the cord at predetermined times and in accurately controllable amounts, and for activating the various parts and elements of the apparatus in a selected time sequence and relationship.

A preferred embodiment of the invention in an improved apparatus having the capabilities and features referred to, is illustrated in the accompanying drawings, in which—

FIG. 8 is an enlarged detail, in the direction 8—8 of FIG. 4, of an optionally employable guide loop positioner;

FIG. 9 is an elevational view from the left side of FIG. 8;

FIG. 10 is a fragmentary view, substantially on the line 10—10 of FIG. 1, of the cord-engaging finger and its moving means;

FIG. 11 is an enlarged view of the finger itself;

FIG. 12 is a diagram of one of the control networks;

FIG. 13 is a similar diagram of another set of elements cooperating in a cycle of operations; and FIG. 14 is a view of a part of a fishing rod to which a guide loop has been secured by an overlaying of two cord helices.

Figure 1:
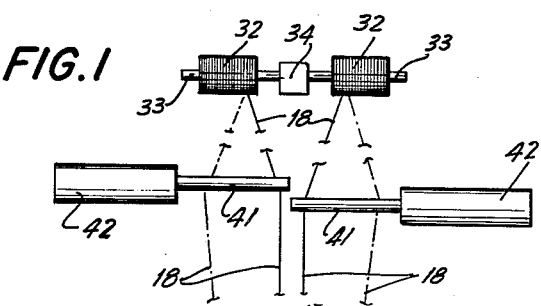
FIG. 1 is a plan view of some of the elements of the apparatus.

For the sake of simplicity of illustration, some of the figures are of diagrammatic nature, with unessential parts of the supporting framework omitted.

The general objective of the manufacturing procedure to which the apparatus is directed is shown in FIG. 14. Mounted on and secured to the fishing rod section 20 is a guide loop comprising a circular ring 21 and a pair of oppositely extending attachment feet 22 (see FIGS. 8 and 9 also). The ring or loop 21 lies in a plane perpendicular to the rod 20 and the feet 22 lie against the rod in parallel relation to its axis. The guide loop is bound to the rod by a pair of helical cord windings 23. Each of these has a closely wound area 24 encircling one of the feet 22 and extending somewhat beyond the end of the foot; the pitch of the helix is then increased to define an expanded helical area 25; the outermost turns of the helix are again closely wound as indicated at 19. The opposite ends of each winding are turned in to lie beneath the adjacent turns, this technique being of well-known character.

The expanded area 25 is provided only for ornamental effect. Its longitudinal extent is optional. By way of example, in the arrangement shown in FIG. 14 the rod 20 may have a diameter of about ¼ or ⅜ of an inch, the area 24 is about 1 inch in extent, and the area 25 extends for about ¾ inch. In the finished product the windings are usually lacquered or otherwise treated to assure permanence.

Figure 4:
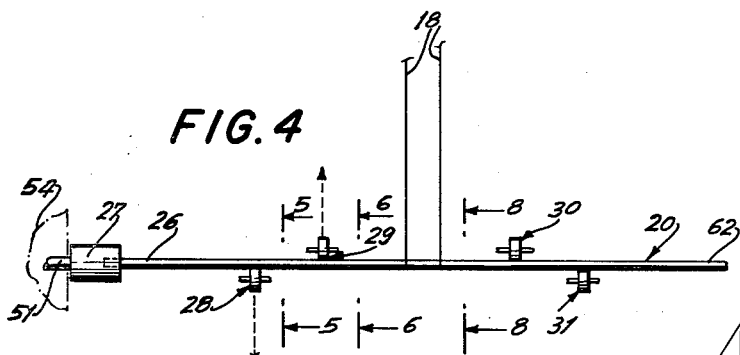
FIG. 4 is an enlarged plan view of the rod and chuck of FIG. 1, showing also the rod guides both stationary and movable.
Figure 5:
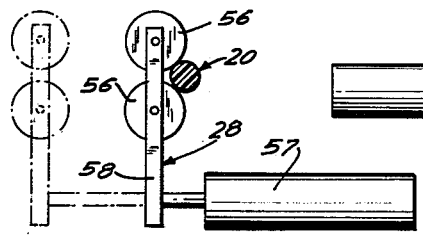
FIG. 5 is an enlarged elevational view of one of the movable rod guides, this view being along the line 5—5 of FIG. 4.
Figure 6:
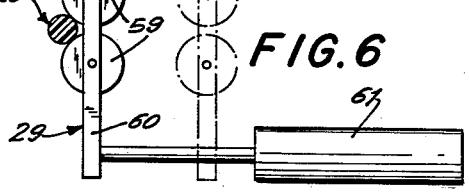
FIG. 6 is similar to FIG. 5, along the line 6—6 of FIG. 4.

To produce these windings with the aid of the improved apparatus, the rod or rod section 20 is first mounted for rotation on its axis. In the apparatus illustrated the rod assumes a horizontal disposition with one end (in this case the left end) 26 releasably secured within a suitable chuck 27. The rod is supported near its opposite end by positionally fixed rod guides 30, 31 (FIG. 4) and in an intermediate region by laterally withdrawable rod guides 28, 29 (FIGS. 4, 5, 6). These rod supporting guides will be described more fully hereinafter.

It is in the region between the two sets of rod guides that a guide loop is to be secured to the rod, and the framework of the apparatus is so designed that an operator or attendant may stand or sit directly in front of this location (designated "work position" in FIGS. 1 and 4).

Mounted at a substantial distance behind the work position (i.e., five or six feet away) is a pair of supply spools 32 carrying the cords to be wound onto the rod 20. In the apparatus shown these spools are mounted on horizontal spindles 33 extending in opposite directions from a center post 34. For a purpose presently to be described the post 34 rises from a framework 35 mounted for reciprocating movement (see arrows in FIG. 3) upon guide rails 36.

Cords 18 are drawn forwardly from the spools 32 toward the rod 20, and are caused to approach the rod along closely parallel paths at substantially right angles thereto. This is achieved by threading each cord through a cord guide located about 12 to 15 inches in front of each spool. The cord guides shown are designated 41 and are formed at the adjacent ends of two opposed rods projecting from pistons within fluid-pressure cylinders 42. The cord guides 41 normally guide the cords along parallel paths about ½ inch apart. Just behind the rod 20 each cord 18 passes within the range of action of a cord engaging finger 37 (FIGS. 10, 11) normally above the line of direct travel (full-line position of FIG. 10).

Prior to the commencement of winding, the guide loop is temporarily held by a friction clamp 38 mounted above the rod 20 at the work position (FIGS. 8, 9). The clamp 38 is mounted for movement between a poised position above the rod (dot-dash lines) and a loop-placing position (full lines). The clamp 38 may consist of a simple springy jaw adapted to engage the loop section 21 of the guide loop. It may be carried by an arm 39 pivoted at 40 in such a way that when the clamp is brought down it will place the guide loop directly upon the rod 20 and hold it in centered position thereon with the attachment feet 22 extending along the rod in the contemplated fashion (FIG. 9).

The operator thereupon secures the front ends of cords 18 to the rod 20, in positions close to the inner ends of the attachment feet 22 respectively. Each cord is secured in a manner which defines the first turn of the contemplate helical winding, so that when the rod 20 is set into rotation the winding will continue automatically with each turn lying closely against the preceding turn. Such automatic formation of a closely wound helix is a result of the camming action on each new winding as it brushes against the next preceding winding, such as is shown in U.S. Patent No. 3,086,720. This uniform winding is assured in part by the circumstance that the tension on the cord is uniformly maintained and in part by the close proximity of the cord guides 41 at a substantial distance away. After a predetermined period (usually not more than a few seconds) the guides 41 are rapidly moved apart and then brought together again. This shifts the feed momentarily to the dot-dash positions shown in FIG. 1, and during this shift the pitch of each helix is increased slightly, thus creating the expanded helical areas 25 of the windings. The return of the cord guides 41 to their normal proximity restores the close winding of the turns as at 19 (FIG. 14).

Just prior to the completion of each winding, the rod rotation stops and the fingers 37 move obliquely downward to bring the cords to the dot-dash positions shown in FIG. 10. The operator can then conveniently and rapidly cut each cord in the region 43, just in front of the finger 37, and attend to the tucking-in of the terminal ends of the windings about to be completed. Each new cord end is in the meantime firmly engaged by the finger 37 and held in readiness for the commencement of the next winding to be made. To engage the cord in the desired firm but readily releasable fashion, each finger 37 may consist of a rubbery element 44 held at its side edges by the rims 45 of a retaining piece bolted at 46 to the forward end of a rod 47. The rubbery element 44 is thinned at the center of its exposed front edge and is provided with a slit 48 which frictionally engages the cord when the finger is moved obliquely downward against it. The articulation 46 is an adjustable rotatable one so that the angular disposition of the finger may be accurately varied.

Figure 3:
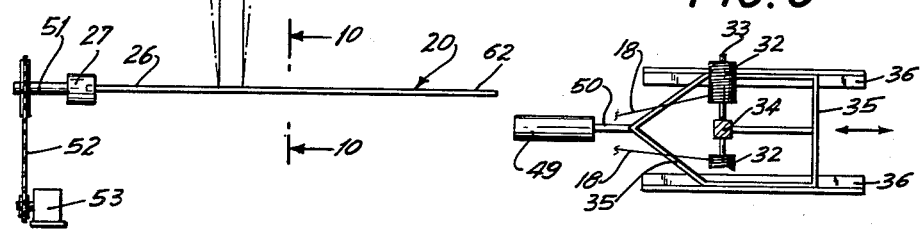
FIG. 3 is a plan view of FIG. 2, at approximately the level 3—3 of FIG. 2.

The movability of the cord spool carrier as indicated in FIG. 3 is for the purpose of allowing cords of reduced tensile strength to be used, if desired. A fluid-pressure cylinder 49 controls the back-and-forth movements of a piston rod 50 which is joined to the framework 35. By shifting the cord spool carrier forward toward the rod 20 by a small amount, the initial securement of each cord can be attended to by the operator without danger of over-tensioning and possibly rupturing the cord. Then, just before the winding of the cords by rod rotation is commenced, the carrier 35 is gently returned to its rearward setting by actuation of the cylinder 49, to impart the precise degree of tension which the winding operation calls for. By regulating or pre-setting the stroke of the piston 49, the tension imparted to the cords can be accurately controlled.

Figure 7:
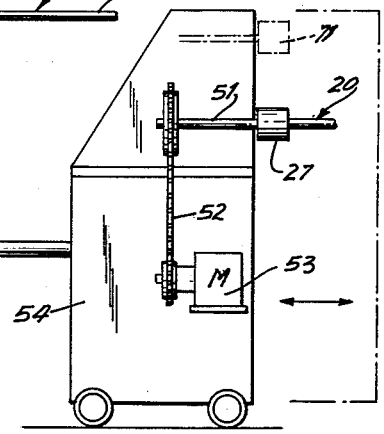
FIG. 7 is an elevational view of the movable carriage for the rod-rotating means.

The rotation of the rod 20 is brought about by the chuck 27, which is mounted on the end of a shaft 51 connected by chain drive 52 (or equivalent mechanism) to a driving motor 53. This assemblage is mounted in its entirety upon a movable carriage 54 (FIG. 7). This carriage is mounted on rails or the like for movement back and forth between the full-line and dotted positions. A fluid-pressure cylinder-piston arrangement 55 controls these movements, the purpose of which is to bring selected different regions of the rod 20 to the work position.

During the rotation of the rod, the rod guides 28, 29 and 30, 31 help to support the rod and maintain its axis true. Each rod guide may consist of a pair of superposed idler rollers. For example, the rod guide 28 is shown in FIG. 5 in the form of an upstanding post 58 in which the two idlers 56 are journalled. The post 58 is secured to the end of a piston rod projecting from a fluid-pressure cylinder 57. The guide as a whole is shiftable in a lateral direction between the full-line and dotted positions shown in FIG. 5, and the idlers are at just the right height to engage and afford rotative support for the rod 20 when the guide is in the operative (full-line) position. The rod guide 29 is of similar construction and consists of the idler rollers 59, and the post 60, shown in FIG. 6. This guide is on the opposite side of the rod 20, as shown in FIG. 4, and the lateral withdrawal movement is brought about by the fluid-pressure cylinder 61 shown in FIG. 6.

The fixed rod guides 30, 31 may be similarly formed of idler rollers like those described, but these guides are not laterally movable.

The reason for making the rod guides 28, 29 laterally movable is to permit the carriage 54 to shift the rod 20 axially in a leftward direction (as viewed in FIG. 4) after a guide loop has been secured to it and another guide loop is then to be secured to another region. Thus, with a guide loop bound to the rod at the work position in FIG. 4, by means of the winding procedure hereinbefore described, a shifting of the rod to the left would bring the region 62 to the work position for the next winding procedure. Because of the presence of the guide loop on the rod, the guides 28, 29 must withdraw temporarily as the rod passes; then they resume their normal positions.

The sequential timed control of the various operations is diagrammed in FIGS. 12 and 13. Participating in the rod-rotating cycle of operations shown in FIG. 12 is a switch 63, manually operable, a timer 64 set into operation by the switch 63, the motor 53, the cord-guide-moving cylinders 42, and the activating cylinder 65 for the cord-engaging finger 37. Each of the cylinder-piston instruments is of known kind, provided with inlet and exhaust 66 for any suitable pressure fluid, and a solenoid-operated control valve 67. The timer 64 may be of any known kind adapted to close and open a succession of electric switches in a predetermined timed sequence, the timing being adjustable to suit varying requirements.

Participating in the rod-shifting cycle of operations (FIG. 13) is a pair of manually operated switches 68 and 69 controlling the solenoid control valve of the carriage-moving cylinder 55, and a switch 70 controlled by the carriage 54 itself upon the completion of one of its movements. The switches 68 and 70 control the solenoid valves on the cylinders 57 and 61 controlling the movable rod guides 28, 29.

The operation is as follows: With the chuck carriage 54 in the position nearest to the work position, the operator fits a rod section into engagement with the fixed and movable rod-supporting guides 28–31 and engages the left end of the rod section within the chuck 27. The clamp 38 (into which a guide loop element has been previously inserted) is then brought down to the full-line position of FIGS. 8, 9 to locate the guide loop on the rod. The operator then secures the available front ends of the cords 18 to the guide loop, initiating each of the oppositely extending helical windings. Actuation of the switch 63 thereupon activates the timer 64, and, in sequence, the cord-engaging fingers 37 withdraw to the full-line positions of FIG. 10 and the motor 53 starts to rotate the rod 20. A few seconds later, during continued rod rotation, the cord-guide cylinders 42 function to move the cord guides 41 outwardly and back again. The motor 53 then stops temporarily while the cord-engaging fingers 37 come forward again to make the cords 18 available to the operator. The cords are cut and the terminal ends manipulated for final tucking-in, whereupon the motor 53 starts again to complete the windings and then comes to a final stop. The cycle of operations initiated by the switch 63 is thus completed. The operator now actuates the switch 68, as a result of which the cylinders 55, 57, and 61 are simultaneously activated. The cylinders 57 and 61 function to withdraw the movable rod guides to the dotted positions of FIGS. 5, 6, and the cylinder 55 functions to move the carriage 54 to the full-line position of FIG. 7. Upon the completion of its movement the carriage 54 (or a part carried by it) actuates the switch 69 which reverses the activation of the cylinders 57 and 61 to restore the rod guides 28, 29 to normal rod-supporting locations. This cycle of operations is thus completed. The operator now has a new section of the rod at the work position, and is ready to repeat the rod-rotating operations as previously described, to secure another guide loop element to the rod. When that has been accomplished the rod is removed from the apparatus. Activation of switch 70 now causes cylinder 55 to restore the carriage 54 to its initial position and the entire procedure can then be repeated.

In the apparatus described, the chuck-carriage moves back and forth through a predetermined distance, and the apparatus is therefore useful for the attachment of two guide loops to a fishing rod section, spaced apart by the distance through which the carriage moves. If more than two guide loops are to be secured to a fishing rod section, a means would be provided for moving the carriage through two successive increments, or more, to bring a correspondingly greater number of rod regions to the work position.

Figure 2:
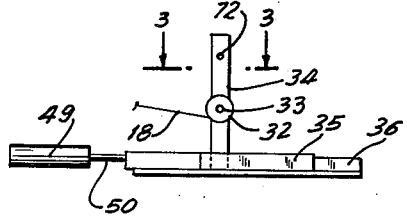
FIG. 2 is a fragmentary elevational view of the cord spool holder and its mounting.

It is also possible, if desired, to carry on more than two winding operations at the work position at the same time. Thus if a second chuck 71 were mounted on the carriage 54 (FIG. 7) at a slight distance above the chuck 27, and if correspondingly additional rod-supporting guides were to be provided, two rods could be rotated simultaneously. Of course this would call for two additional cord spools, and for this purpose the post 34 (FIG. 2) can be provided with two additional spindles 72 parallel to and spaced above the spindle 33. Another pair of cord guides, similar to those shown at 41, would be provided for the cords emanating from the two additional spools.

It will be understood that other modifications of similar kind, and changes in the details herein described, may be made without necessarily departing from the spirit and scope of the invention as expressed in the appended claims.

What is claimed is:

1. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, and means for moving said rod axially after winding of the cord has been completed and rotation of the rod has been discontinued to bring selected regions into alignment with said cord, said last named means comprising a movable carriage for the rod rotating means, rod-supporting guides adapted to engage the rod frictionally to allow axial movement of the rod with respect thereto, and means for moving said carriage.

2. An apparatus as defined in claim 1, wherein said rod-supporting guides are mounted for movement transversely toward and away from the rod, and including means for moving said movable guides.

3. An apparatus for overlaying a fishing rod or the like with cord, comprising means for engaging the rod and rotating it on its axis, a cord spool mounted at a substantial distance from the rod and adapted to supply the cord to the rod at substantially right angles thereto, whereby the rotation of the rod will draw the cord onto the rod in a closely wound helix a cord guide mounted for movement substantially parallel to said rod, said cord guide being normally stationary during winding to provide an area of close helical winding on said rod, means for moving said cord guide in a direction substantially parallel to said rod to provide an area of expanded helical winding, the last-named means including means to cause reversal of direction of movement of said cord guide to provide a second area of close helical winding on said rod, and timing means operatively connected to said guide to determine the periods of close and expanded helical windings.

4. The method of securing a guide loop to a fishing rod, said loop having oppositely extending attachment feet lying lengthwise of said rod, which includes the steps of supplying two cords in close proximity toward the rod at an angle of substantially 90° and from a point remote enough from the rod to prevent the cord from winding back upon itself, securing the guide loop to the rod by attaching the ends of said cords to said feet and rod at the inner ends of said feet, respectively, and rotating the rod to wind said cords around said feet and rod along oppositely extending helices that start at the base of each foot and extend appreciably beyond it.

5. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being mounted for reciprocating movement in a direction parallel to the rod, and said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, and means for moving said cord guide in the direction of progression of the helix and then back to its normal position within only a portion of the total time during which the rod rotates so as to create ornamental expanded-helix areas on the rod in the region beyond said secured attachment foot.

6. An apparatus as defined in claim 5 including means for activating said cord guide moving means a predetermined time after rotation of the rod begins, and deactivating said cord guide moving means a predetermined time before rotation of the rod ceases.

7. An apparatus for securing a guide loop to a fishing rod, said loop having oppositely extending attachment feet lying lengthwise on said rod and said securement being effected by whipping said rod and feet with cord, comprising means for supporting the rod for rotation on its axis, a pair of cord spools mounted at a substantial distance from the rod and adapted to supply two cords in close proximity to the rod at substantially right angles thereto, means for rotating the rod, whereby said rotation can be caused to complete the winding of said cords onto the rod and attachment feet, respectively, in closely wound helices extending apart in opposite directions, means for moving said rod axially to bring selected regions into alignment with said cords, said last-named means comprising a movable carriage for the rod rotating means, means for moving said carriage, rod-supporting guides adapted to engage the rod frictionally to allow axial movement of the rod with respect thereto, said rod-supporting guides being mounted for movement transversely toward and away from the rod, means for moving said movable guides, and means for controlling the guide-moving means and the carriage moving means in predetermined timed relation.

8. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, a cord engaging finger for said cord mounted adjacent to the rod for reciprocating movement in a direction transverse to the rod axis, said finger being adapted frictionally to grasp the cord and advance the grasped part to the side of the rod remote from said spool, and means for activating said finger movement after completion of the winding operation.

9. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, a cord engaging finger for said cord mounted adjacent to the rod for reciprocating movement in a direction transverse to the rod axis, said finger being adapted frictionally to grasp the cord and advance the grasped part to the side of the rod remote from said spool, means for moving said finger, and means for controlling the finger moving means and the rod rotating means in predetermined timed relation.

10. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, a cord engaging finger for said cord mounted adjacent to the rod for reciprocating movement in a direction transverse to the rod axis, said finger being adapted frictionally to grasp the cord and advance the grasped part to the side of the rod remote from said spool, means for moving said finger, and means for automatically activating said finger moving means to advance the grasped cord part as described upon completion of the winding operation.

11. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a spool for supplying cord, a normally stationary cord guide through which the cord is directed from said spool to the rod, said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, and means for moving said rod axially after winding of the cord has been completed and rotation of the rod has been discontinued to bring selected regions into alignment with said cord.

12. An apparatus for securing a guide loop to a fishing rod by means of cord, said loop having oppositely extending attachment feet lying lengthwise on the rod, each foot having an upper surface sloped outwardly and toward the rod and the end of a cord being tied to the inner end of each foot and the rod at the initiation of the securing procedure, comprising means for supporting the rod for rotation on its axis, a pair of spools for supplying cord, a normally stationary cord guide for each spool through which cord is directed from its respective spool to the rod, said cord guides being mounted for reciprocating movement in a direction parallel to the rod, and said cord guide being located a substantial distance from the rod and so positioned that the cord approaches the rod at the initiation of the securing procedure at substantially right angles to the rod, means for rotating the rod to cause the cord to be wound about the rod and attachment foot, the slope of said foot causing the windings of the cord to form a helix extending outwardly from the inner end of said foot, the distance between said cord guide and the rod being large enough to prevent the cord from winding back upon itself, and means for moving said cord guides simultaneously apart and then together within only a portion of the total time during which the rod rotates.

References Cited by the Examiner
UNITED STATES PATENTS

| | | | |
|---|---|---|---|
| 1,809,660 | 6/31 | Wild et al. | 242—19 |
| 2,426,522 | 8/47 | Porter | 242—9 |
| 2,550,131 | 4/51 | Wodetzky | 242—7 |
| 2,609,155 | 9/52 | Fosnaugh | 242—7 |
| 2,778,285 | 1/57 | Pasquale | 242—7 |
| 3,039,706 | 6/62 | Toth et al. | 242—9 |
| 3,086,720 | 4/63 | Leach | 242—30 |

MERVIN STEIN, *Primary Examiner.*